US008626716B1

(12) United States Patent
Katzer et al.

(10) Patent No.: US 8,626,716 B1
(45) Date of Patent: Jan. 7, 2014

(54) SERVICE BROKER ENHANCEMENTS

(75) Inventors: Robin D. Katzer, Olathe, KS (US); Wing K. Lee, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2057 days.

(21) Appl. No.: 10/820,969

(22) Filed: Apr. 8, 2004

(51) Int. Cl.
*G06F 7/00* (2006.01)
*G06F 17/00* (2006.01)

(52) U.S. Cl.
USPC .......................... 707/646; 707/640; 707/655

(58) Field of Classification Search
USPC .................................. 718/100; 707/3, 10, 100
See application file for complete search history.

(56) References Cited

U.S. PATENT DOCUMENTS

| | | | |
|---|---|---|---|
| 5,734,887 A * | 3/1998 | Kingberg et al. | 707/4 |
| 5,813,009 A * | 9/1998 | Johnson et al. | 707/100 |
| 6,484,173 B1 * | 11/2002 | O'Hare et al. | 707/9 |
| 6,505,200 B1 | 1/2003 | Ims et al. | |
| 6,625,602 B1 * | 9/2003 | Meredith et al. | 707/8 |
| 6,691,115 B2 * | 2/2004 | Mosher et al. | 707/10 |
| 6,826,560 B1 * | 11/2004 | Leymann et al. | 707/3 |
| 7,177,866 B2 | 2/2007 | Holenstein et al. | |
| 7,624,376 B1 | 11/2009 | Katzer et al. | |
| 8,027,922 B2 | 9/2011 | Lee | |
| 2002/0152278 A1 | 10/2002 | Pontenzone et al. | |
| 2004/0216107 A1 * | 10/2004 | Somogyi et al. | 718/100 |

OTHER PUBLICATIONS

Lee, Wing K., *Architecture and Method for Real-Time Asynchronous Data Warehousing with Transactional Integrity*, Filing Date—Apr. 8, 2004, U.S. Appl. No. 10/820,619, Specification (47 pgs.) and Drawings (8 sheets).

Lee, Wing, *Integration Infrastructure*, Filing Date—Jul. 14, 2003, U.S. Appl. No. 10/619,296, Specification (32 pgs.) and Drawings (6 sheets).

Office Action dated Jan. 4, 2007 (9 pages), U.S. Appl. No. 10/820,619, filed Apr. 8, 2004.

Final Office Action dated Jun. 4, 2007 (8 pages), U.S. Appl. No. 10/820,619, filed Apr. 8, 2004.

Advisory Action dated Aug. 13, 2007 (4 pages), U.S. Appl. No. 10/820,619, filed Apr. 8, 2004.

Office Action dated Nov. 26, 2007 (9 pages), U.S. Appl. No. 10/820,619, filed Apr. 8, 2004.

Final Office Action dated Jun. 13, 2008 (12 pages), U.S. Appl. No. 10/820,619, filed Apr. 8, 2004.

Advisory Action dated Aug. 27, 2008 (3 pages), U.S. Appl. No. 10/820,619, filed Apr. 8, 2004.

Office Action dated Dec. 2, 2008 (11 pages), U.S. Appl. No. 10/820,619, filed Apr. 8, 2004.

(Continued)

*Primary Examiner* — Paul Kim

(57) ABSTRACT

A data access layer operable to manage data requests from one or more software applications is provided. The data access layer includes a query processor, a metadata repository, a transaction data store, and an exception handler. The query processor manages transaction processing of data requests between applications, such as commercial-off-the-shelf software applications, and data stores. The metadata repository maintains a logical data model related to the data to provide instructions regarding handling the data requests from the application. The transaction data store maintains transaction information. A data warehouse may be updated along with the data stores by publication and subscription of data updates. When an error related to processing the one of the data requests is detected, the exception handler uses the transaction information to return any of the data to its previous state using compensating transactions.

15 Claims, 8 Drawing Sheets

(56) References Cited

OTHER PUBLICATIONS

Katzer, Robin D., et al., Patent Application entitled, "Integration of COTS Software Data Stores Into Integrated Data Access Layer," filed Apr. 8, 2004, U.S. Appl. No. 10/820,539.

Examiner's Answer dated May 26, 2010 (17 pages), U.S. Appl. No. 10/820,619, filed Apr. 8, 2004.

Final Office Action dated Jun. 12, 2009, 15 pages, U.S. Appl. No. 10/820,619, filed Apr. 8, 2004.

Advisory Action dated Aug. 25, 2009, 3 pages, U.S. Appl. No. 10/820,619, filed Apr. 8, 2004.

* cited by examiner

SERVICE BROKER ENHANCEMENTS

CROSS-REFERENCE TO RELATED APPLICATIONS

This application contains related subject-matter to U.S. patent application Ser. No. 10/619,296 filed Jul. 14, 2003 and entitled "Integration Infrastructure", and to U.S. patent application Ser. No. 10/820,619 filed on even data herewith for "Architecture and Method for Real-time Asynchronous Data Warehousing with Transactional Integrity".

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the transfer of data among computer-based data storage systems. More particularly, embodiments of the present invention provide for the management of data transactions with commercial, off-the-shelf data stores and for the updating of data in data warehouses.

BACKGROUND OF THE INVENTION

When multi-step data transfer transactions take place among computing systems, errors can occur at any step in a transaction. When an error does occur in a step, it is often desirable to reverse any data changes that were made in that step and in previous steps. Many commercial, off-the-shelf (COTS) applications do not have internal mechanisms that provide for transaction processing for the data stores. That is, there is typically no automated method for rolling back a change that has been made to the data in a COTS application. As used herein, the term "data store" can refer to various computer-based storage systems, protocols, and applications such as relational databases, directories, and spreadsheets.

Transactions with the data stores used in an enterprise's day-to-day operations are sometimes limited to the updating of critical data. It is typically undesirable to interrupt these critical updates with routine requests for the retrieval of data. Such queries can instead be made to another type of data storage system known as a data warehouse. Data warehouses typically contain copies of the data contained in multiple data stores. Copies of all of the data in the operational data stores are typically sent to a data warehouse in a periodic, batch process. Routine queries can then be made to the static data in the data warehouse and the operational data stores can be left free for more critical activities. However, due to the batch nature of the copying of data from the operational data stores to the data warehouses, the data warehouses may not always contain the most current version of the data in the data stores.

As further background, messaging has emerged as a popular form of asynchronous communication between heterogeneous computing systems and applications. Several middleware and enterprise architecture tool vendors offer messaging solutions based on proprietary technology that can converge middleware and application services by combining application servers with messaging and business process management solutions. Other trends include end-to-end integration across enterprises and the emergence of new web-based service standards such as XML, SOAP, and UDDI. In addition, JMS provides a standard interface for incorporating messaging within Java applications. It acts as a wrapper around the messaging technology of other vendors.

Several types of topology can support messaging. These include publish/subscribe, point-to-point, hub and spoke, bus, and distributed hub. Publish/subscribe messaging is organized around topics. A publisher sends a message to a topic and any interested subscriber can receive the message from the topic. Publish/subscribe messaging is typically used when multiple subscribers might be interested in the same message. It is appropriate for notification messages for which no response is required upon consumption. It is also useful for enterprise-level messages such as account creation, account termination, and subscription suspension. For example, a message server could publish an "account created" event after an account has been created and subscribers could consume the message.

Point-to-point messaging is based on message queues. A producer sends a message to a specified queue and a consumer receives messages from the queue. Multiple senders and receivers are possible for a queue but an individual message can be delivered to only one receiver. Point-to-point messaging is typically used when only one consumer exists and the message is targeted for a known application. It is also useful when successful consumption by the target system is a requirement since messages stay in the queue until the receiver picks them up. As an example, point-to-point messaging would be appropriate within a telecommunications company when a message to reserve a mobile telephone number is transmitted. Such a message would typically be transmitted to only one consumer.

In hub and spoke messaging, all applications are connected to a central message server. The message server is responsible for routing, authentication, access control, and transformation between data types. An application can act as a publisher and the message server can act as a subscriber or the message server can act as a publisher and an application can act as a subscriber. Hub and spoke messaging is typically used when greater control is required outside the applications. For example, because of workflow and timing issues, business process integration is typically tied to a message hub. Hub and spoke messaging is also used when there is a need to keep client applications simple. An intelligent message hub allows the use of simpler clients such as JMS APIs. Since hub and spoke messaging is centralized, it is typically implemented in a clustered environment for fault tolerance. A drawback of hub and spoke messaging is that the message server can become a bottleneck for messages between applications.

Under bus architecture messaging, applications publish and subscribe to messages on a bus. Any application can be a publisher or subscriber. Integration logic and intelligence is distributed in application adapters that handle routing and data transformation. Intelligence is thereby implemented in multiple locations. Messaging over a bus is useful for simple message sharing and broadcasting where complex rules, transformations, and workflows are not required. It is particularly suitable for applications that use the same data representation. It is possible to connect a message server/broker to a bus to centralize processing and rules.

Another messaging approach is the deployment of a distributed hub architecture. In this approach, multiple hubs can be present for different domains or organizations. Each hub could have its own localized rules and use a different messaging vendor or technology. Global rules could be propagated among the hubs. An architecture such as this can alleviate performance bottlenecks.

When applications that use disparate data formats need to communicate with one another, a transformation from one format to the other typically occurs. Two models for accomplishing a data transformation are distributed transformation and centralized transformation. In the distributed model, an adapter is present between each application and a common message server. The adapters can transform data between an application-specific format and a common format. When an application publishes a message it sends the message to its adapter. The adapter transforms the message from the application's native data format to the common data format and sends the message to the message server. When another application wishes to subscribe to the message, that application's adapter receives the message from the message server in the common data format. The adapter then transforms the message into the native data format of the second application and sends the message to the second application. A well-defined, stable protocol such as XML is preferable for the common data format. Messaging systems that use the publish/subscribe protocol are good candidates for this approach.

In the centralized transformation model, all data transformation is done in a central location. A first application that wishes to send a message to a second application can publish the message in its native format. The message is then sent to a centralized message server where a transformation takes place between the data format of the first application and the data format of the second application. The second application can then receive the message in its native data format. The centralized transformation model thus uses a pair-wise mapping approach between the source and destination systems. This approach is more applicable than the distributed transformation model to communication between commercial, off-the-shelf packages. Centralized, pair-wise transformation is also appropriate for systems that use point-to-point communication and for non-enterprise events such as the transfer of data that is specific to only a few applications.

Two types of messaging can be described, data messaging and notification messaging. In data messaging, all of the data that one application wishes to transfer to another application is packaged in a single published event. The sending application publishes the data to a message server and the message server transfers the data to the receiving application when the receiving application subscribes to the published event. The receiving application receives all of the relevant data as part of the message; it does not need to perform any extra queries. Data messaging places a heavy load on the message bus. This type of messaging is suitable for communication between commercial, off-the-shelf applications since all the data to be transferred between two such applications typically must be contained within a single published event. Data messaging is also appropriate for communication across domains within an enterprise.

In notification messaging, an application sends its data to an information broker which places the data in a data store. The application then publishes a notification message to a message server informing a receiving application that the data is available. Upon receiving the message from the message server, the receiving application can query the information broker which then retrieves the data from the data store and transfers it to the receiving application. Since the notification message that is published from the sending application to the message broker contains only a small amount of data, a lighter load is placed on the message bus compared to data messaging. Notification messaging is appropriate for distribution of data to custom-developed applications since these applications can be modified as needed to make queries to the information broker for the desired data.

The queues or channels through which applications and a message server communicate can be application-specific or shared. In the application-specific queue architecture, a separate request and reply queue is present for each application. An application always places its messages on and receives its messages from the same queue. This architecture promotes easy identification of the source of a message and allows the message server to control when applications receive messages. Application-specific queues are useful in the hub-and-spoke and point-to-point messaging systems.

In the shared queue architecture, queues and messages are shared between multiple applications. This allows multicasting of messages to multiple applications. Queues can be grouped by functions or domains such as account information, profile information, security information, or services information. This promotes the implementation of common processes but can require that filtering be implemented in each application. Shared queue architecture is appropriate for the publish/subscribe and bus messaging systems and other situations where the timing of event consumption is not an issue.

Numerous criteria can be used in the selection of a messaging technology. One factor is the level of support for multiple communication paradigms such as publish/subscribe, point-to-point, hub and spoke, and bus-based topology. Another factor is quality of service issues such as guaranteed delivery of messages and priority of messages. The level of security support, including items such as Secure Socket Layer, authorization, authentication, and firewalls, can also be taken into consideration. Massive scalability and high throughput without appreciable performance degradation are also desirable. Another factor is the use of a standards-based implementation such as Java or XML rather than reliance on product-specific knowledge. Connectivity to other messaging systems such as JMS and Tuxedo is also desirable. Coexistence with an application server, while not typically required, is often desirable.

Messaging implementations often fail due to poor implementation of the messaging tool as opposed to the inadequacy of the tool itself. An enterprise architecture group can provide guidance on key areas as part of the architecture definition for event-based messaging. For example, the enterprise architecture group could assist in choosing among the various messaging models. Whether a common enterprise model will be used for event specification as opposed to application-specific event specification can also be decided. A decision can be made on whether to use centralized or distributed data transformation. Guidelines can be established for queue architecture such as whether there will be a single input and a single output queue per application, whether there will be shared queues, and whether multiple messages or business events can be placed on the same queue or if a separate queue will be used for each business event. It can also be decided whether JMS wrapping will be used for messaging technology and whether a combination of event-based messaging and an information service layer will be used for complete data and transaction management.

FIG. 1 depicts an enterprise architecture in which front-end clients are integrated with back-end systems through an Enterprise Integration (EI) layer. The front-end clients, such as Premiere 110, IVR 120, CTI 130, and SPCS 140, can use the EI layer 100 to access back-end systems where data is hidden from the client applications. The EI layer 100 provides access to data located in two types of stores, back-end systems such as P2K 150, NMS 160, and Renaissance 170, and an integrated database of operational data that can be referred to as the Operational Data Store (ODS) 180. The ODS 180 can be largely replicated from other back-office applications but can also serve as the System of Record for some data. The EI layer 100 can access the appropriate data store using system-specific protocols such as SQL, CORBA 155, MQ 165, or RMI 175. Front-end applications can use IBM's asynchronous MQSeries messaging 185 to interact with the EI layer 100. A queue can be set up for each function or business transaction and multiple front-end applications can use the same queue when calling the same business transaction. The EI layer 100 can support create, read, update, and delete (CRUD) functions, particularly the translation of back-end Application Programming Interface (API) calls.

The EI layer 100 can be implemented as a set of C++ programs called Business Logic Modules or BLMs, each of which provides a separate transaction. Each BLM can read messages from and write messages to an individual queue. Transformation logic and source data rules can be hard-coded in the BLMs. Each BLM that requires access to a particular back-end system can contain API logic to communicate with that system. A reusable framework for logging, exception management, and connection management could be present within the BLMs.

An enterprise integration architecture such as this has several limitations. First, there may be no infrastructure support for a business event notification mechanism such as publish/subscribe messaging if communication between front-end applications and the EI layer is done through point-to-point messaging or if communication with back-end systems is done with APIs or with MQSeries. There may be no adapters or connectors to isolate the enterprise from application-specific requirements and there may be no transformation tools for translating an enterprise-specific data format into application-specific formats. If data transformation is hard coded, changes to data mapping can be expensive. Also, since client applications may be required to use a message-oriented protocol for data access, development complexity and a performance bottleneck can result. In addition, no rules repository may exist to define System of Record rules based on subject area. This means that the reorganization of data could lead to code changes. Another limitation may be the use of fixed-length field structures as opposed to self-describing message formats such as XML. Such structures require that code changes be made as new data elements are introduced. A lack of support for transaction management could be another limitation. There may also be no use of metadata. Other limitations could include an architecture that is not component-based, an inadequate object model, an infrastructure that is unable to achieve a desired uptime and response time, and a reduced speed in deploying new interfaces because of the lack of appropriate tools and technologies within the integration layer. These limitations can lead to difficulty in making changes, an inadequate reuse of business-related services, a higher cost of maintenance and debugging, a longer time to market for new capabilities and changes, and the necessity for increased testing due to the lack of isolation of functionality.

Another limitation is that development of complex client applications may be necessary in order for clients to access back-end data using MQSeries messaging via the EI layer. For example, the use of asynchronous messaging for synchronous data may be required; synchronous methods may not be available to access back-office data and services. The use of MQSeries messaging via the EI layer could also entail the use inflexible message formats that may not shield applications from a ripple effect generated by changes to other systems. A degradation of performance could also result. Another issue is the lack of transmission management in the integration layer. This can result in data being out of synchronization.

Another limitation is that business process steps might be hard-coded in the applications in multiple systems. The same processing step may be duplicated in multiple systems. Modifications to the business processes can require coordinated changes to multiple applications, typically entailing costly code changes. Encoding and changing processes in multiple applications in a timely and cost-effective manner can be difficult and the limited reuse of code lends itself to custom development. Thus, the embedding of business process steps in multiple systems can hinder the ability to roll out new products and services and to make changes to existing ones. For a process requiring multi-step interaction with a back-end application, the steps typically must be encoded in the client and hence may be difficult to modify. Also, there may be no end-to-end visibility of business processes, no tracking capability, and no ability to optimize processes and gain operational efficiency.

Various point-to-point interfaces may exist for key business transactions that are not brokered. These interfaces would bypass the EI layer and directly perform CRUD functions in the target system. Since each target system typically has its own API set, each application that needs to communicate with a particular target system typically needs its own code developed specifically for that target. Thus, the point-to-point interfaces create a tight coupling between applications that can be costly to change. Also, business transactions performed across point-to-point interfaces such as these are not visible to other applications. Applications requiring knowledge of these transactions typically must use data replication to make assumptions about the transactions.

Replication processes can introduce data integrity problems that cause decreased times to failure, increased times to repair, and inflated costs due to rework and data inconsistencies. Replication lag times can cause stale data that can lead to poor customer experience and potential loss of revenue. As replication of data progresses, syntactic and semantic errors can increase with increased distance from the source of the data. Replication processes consume additional resources such as personnel, hardware, and software with each replication. Integration of replication and batch processes is typically point-to-point and based on the structure of the underlying data models. This can cause tight coupling and inflexibility between systems and create a potential bottleneck as the volume of data grows with a rapidly increasing subscriber base. Also, numerous replication logic rules within the target applications may need to be redeveloped so that they can deduce business events from replicated data.

In an enterprise integration architecture such as that just described, each front-office application would typically need to be aware of the locations of data and services in the enterprise and would typically need to use the access mechanism supported by the back-office application to which it is connected. Each application would typically need to understand the format and structure of the data in the back-office system and map it to its own internal representation. Reorganization or relocation of data and services could lead to costly and time-consuming changes to multiple applications.

SUMMARY OF THE INVENTION

The present disclosure provides a data access layer operable to manage data requests from one or more commercial-off-the-shelf software applications. The data access layer includes a query processor, a metadata repository, a transaction database, and an exception handler. The query processor manages transaction processing of data requests between commercial-off-the-shelf software applications and a plurality of data stores. The metadata repository maintains a logical data model related to the data and uses the logical data model to instruct the query processor regarding handling of the data requests from the commercial-off-the-shelf software application. The transaction database is operable to store transaction information related to one of the data requests received from the query processor. The exception handler communicates with the transaction database. The exception handler is operable, in response to notification of an error related to processing the one of the data requests, to retrieve the transaction information from the transaction database for the query processor. The exception handler uses the transaction information to determine whether any data stored in one or more of the plurality of data stores has changed based on the transaction information and further to return any of the data to a previous state, at least a portion of the data returned to the previous state using a compensating transaction.

In another embodiment, a system for transactions processing of data requests from applications is provided. The system comprises an application having a data request, a plurality of data stores to maintain data, and a data warehouse to maintain data. The system further comprises a query processor, a metadata repository, a transaction database, and an exception handler. The query processor manages transaction processing of data requests from the application. The metadata repository maintains a logical data model related to the data. The metadata repository instructs the query processor regarding handling of the data requests from the application and between the plurality of data stores and the data warehouse. The transaction database is operable to store a transaction information related to one of the data requests received from the query processor. The exception handler communicates with the transaction database. The exception handler is operable, in response to notification of an error related to processing the one of the data requests, to retrieve the transaction information from the transaction database for the query processor. The exception handler uses the transaction information to determine whether any data stored in one or more of the plurality of data stores and data warehouse has changed and further to return the data to a prior state, at least a portion of the data returned to the prior state using a compensating transaction.

In another embodiment, a method for managing application data transactions is provided. The method includes receiving, by a query processor, a data request from an application, and storing a transaction record in a transaction database based on the data request. The method includes determining, using a logical data model, one or more data stores and data warehouses to update based on the data request. The method provides for updating one or more data stores based on the data request, determining whether the data stores were successfully updated, and where the data stores were not successfully updated, returning the data in the one or more data stores to a prior state. The method further provides for updating the data warehouse based on the changes to the one or more data stores, determining whether the data warehouse was successfully updated, and where the data warehouse was not successfully updated, returning the data in the data warehouse to a prior state, at least a portion of the data warehouse data and data store data returned to the prior state using a compensating transaction.

DETAILED DESCRIPTION OF THE PREFERRED EMBODIMENTS

Figure 1:
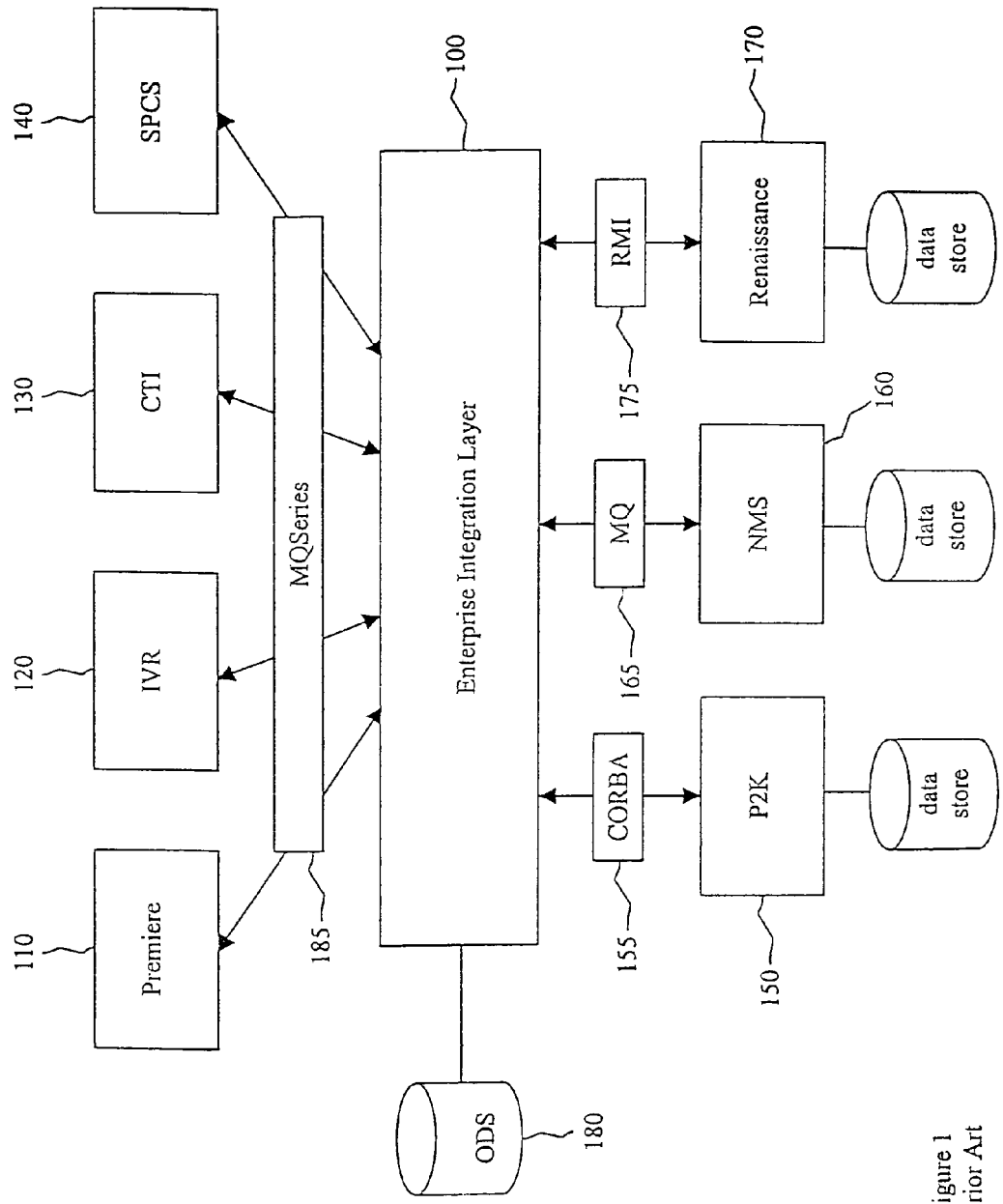
FIG. 1 is a block diagram depicting components in an enterprise integration architecture under the prior art.

To fully appreciate aspects of the service broker enhancements provided herein, the present disclosure includes description of integration infrastructure, messaging, and service broker as provided in U.S. patent application Ser. No. 10/619,296 filed Jul. 14, 2003 and entitled "Integration Infrastructure." FIGS. 2 through 6 and the related description are exemplary of one or more embodiments of systems, techniques, and/or methods whereby the service broker enhancements disclosed hereafter may be employed, however, the present disclosure should not be limited to these exemplary embodiments.

A more efficient manner for distributing data and events to multiple applications is desired. In a target state, an enterprise integration layer such as that described above would become aware of business events rather than merely passing on data and messages. This can be accomplished by integrating the enterprise integration layer with a business process integration engine that implements the core processes of the enterprise and feeds messages to the target systems. In this target state, back-office applications would typically need to be capable of generating or publishing business events. Middleware, such as the enterprise integration layer and the business process integration engine, would not necessarily be involved in business transactions. Applications that rely on batch loading would typically need to be capable of becoming online processes that are ready to consume events, that is, to subscribe to messages. Messaging-based data exchange would reduce the need for batch load processes but not eliminate it. Batch processes might continue to be the most effective means of providing data to some target applications. Messaging would provide an infrastructure to make events persistent, guarantee message delivery, and transform messages for the target system. Messaging would also allow other applications interested in an event to easily plug in to the event. Data would be made available to applications in real-time, thus reducing or eliminating the need for replication and batch loads. Making the enterprise integration layer aware of business events may entail an assessment and realignment of an existing implementation of the layer and its tools, an alignment with the direction of future architecture, and an alignment with business process management and workflow strategy.

Another area in which improvements can be made is in the standardization of technology. It would be desirable to have a set of standardized, service-oriented, synchronous and asynchronous interfaces through which clients can access back-office data and services. Such interfaces could offer decreased complexity resulting in reduced maintenance. The development of standardized connectors and adapters to packaged applications such as Ensemble, Convergys P2K, and Clarify can be achieved using technologies such as Java Connector Architecture. Data transformation tools can be used for data mapping. These techniques for data standardization can eliminate the need for tightly coupled integration and reduce reliance on custom development. The maximum use and reuse of enterprise-wide infrastructure components such as logging, naming, and security and the reuse of existing middleware products such as IBM's MQSeries messaging environment where possible is also desired. Another area in which improvements can be made is in the promotion of the use of publish/subscribe messaging for business event notification. Similarly, asynchronous access to data and services via protocols such as JMS and COSNotification would also be beneficial. The elimination or minimization of data replication, preferably through the use of caching in the integration layer can improve performance and response time. The implementation of transaction management within the integration layer and the provision of transaction semantics can also lead to improvements. This can allow support for high transaction volumes. A business process management system is also desirable. Such a system can deal with long-term needs such as a common enterprise model, business intelligence, and business-to-business integration. The provision of a development environment that allows implementers to deploy, configure, and maintain applications more quickly and easily can also be beneficial. This could reduce development backlog and allow developers to focus on configuration instead of coding.

Other potential areas of improvement can include the development of a monitoring framework, the creation of a high-availability design, and the clustering of similar functions. The use of synchronous request/reply messaging, the use of an integration infrastructure as a business service abstraction layer, and the shielding of client applications from changes that do not directly affect them would also be beneficial. The alignment of message payloads, particularly data lookup responses, to the usage patterns of client applications would also offer improvement, as would a policy of data location transparency.

The development of policies and guidelines on implementation of these components can promote evolution to the target state of infrastructure integration. The steps in achieving infrastructure integration can include identifying current deficiencies, defining the strategy and concepts that will govern the new architecture, developing enterprise-specific detailed integration requirements, and defining an architecture framework. Further steps can include studying industry trends and identifying leading off-the-shelf products, assessing the capabilities of off-the-shelf products in meeting the requirements of the enterprise, examining current capabilities within the enterprise for viable solutions, and finalizing off-the-shelf and internal solutions. Developing a proof of concept, defining a migration strategy for evolution from the current infrastructure to the target state, and identifying projects that can use the new integration components can be additional steps in achieving infrastructure integration.

Figure 2:
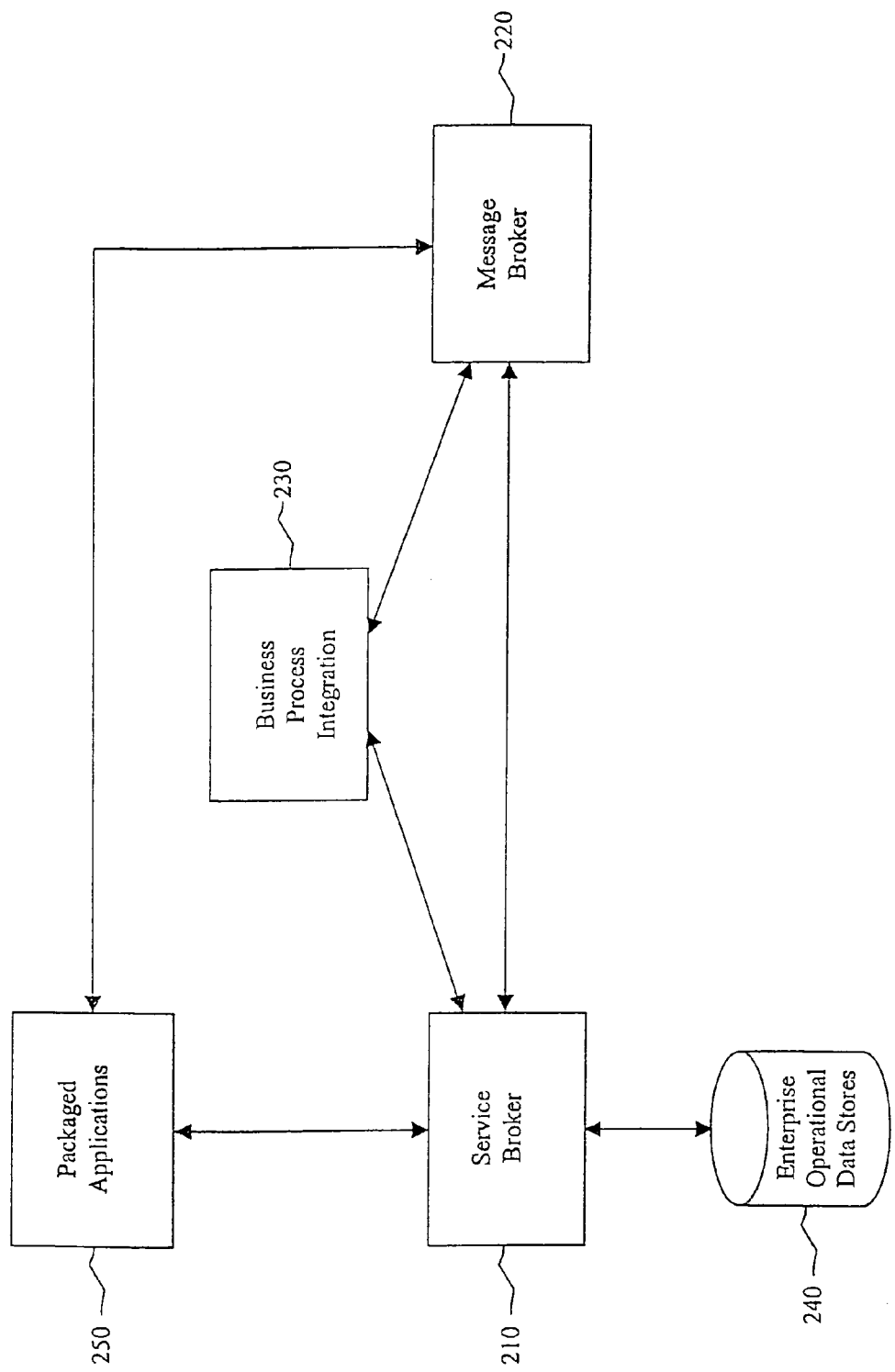
FIG. 2 is a block diagram depicting components in an embodiment of the Integration Infrastructure.

The target state is to develop a framework to provide multiple access mechanisms for enterprise data and services based on an enterprise-wide object model. An embodiment of such a framework, which can be referred to as the Integration Infrastructure, is shown in FIG. 2. The Integration Infrastructure can include an enterprise integration layer that can be referred to as Service Broker 210, a messaging system that can be referred to as Message Broker 220, and a Business Process Integration system 230. An example of a suitable Business Process Integration system is the BusinessWare platform produced by Vitria Technology, Inc. Separate enterprise-wide operational data stores 240 can exist outside of packaged applications 250 to hold replicated data and reference data. The data in the enterprise-wide operational data stores 240 can be kept synchronized with data in the commercial, off-the-shelf packages 250. Transient data and cross-reference data can be maintained in a local data store. A System of Record data store for missing data can also be present. The Integration Infrastructure effort can be aligned with an overall enterprise data strategy. A phased implementation plan can be developed in conjunction with a data architecture group involving prioritization and alignment with projects that are suitable for a first implementation.

The Service Broker component of the Integration Infrastructure provides a means to support integration of front-office and back-office systems for data and services. It simplifies application architecture by standardizing client access to enterprise data and services. Service Broker provides decoupling between consumers and providers of data and services and hides the locations of data and services. Brokering of information and services across a set of enterprise-wide operational data stores and packaged applications is also provided. Service Broker allows applications to access enterprise data and services via multiple technologies including SQL/ODBC, JMS, Java RMI, LDAP, CORBA, MQSeries, Tuxedo, and web services such as SOAP and XML. Java applications, Java objects in an application server, Java servlets in a web server, applications capable of accessing ODBC/JDBC data sources, MSOffice applications with ODBC access tools, and applications with XML interfaces can also access Service Broker functionality. Service Broker can also interface to Message Broker and the Business Process Integrator. Standardized client access interfaces allow clients to perform data operations (such as creation, reading, updating, and deletion) as well as to execute methods and services via any of the above access methods. Service Broker uses back-office metadata repositories that can contain business rules, data transformation rules, and rules for publishing events via Message Broker. This rule-driven architecture also supports validation rules, data and service access rules, caching rules, and event generation rules. Service Broker uses a component-based architecture based on an enterprise-wide object model that represents all major business entities in the operations domain. This modular architecture allows rapid changes to support new requirements. Service Broker provides a transformation mechanism for mapping between an enterprise object model format and back-office system formats. It uses commercially available transformation engines (such as XSLT) rather than hard coding.

Service Broker can define and generate business events and publish the business events to all applications that need to be aware of the events. Business events are key milestones within a process flow such as the completion of a credit check or the creation of an account. Information about events such as these is often needed by multiple applications within an enterprise. When a clear definition of business events or their sources does not exist, applications must deduce that business events have occurred by replicating data and applying rules. These methods cannot be done in real time and are time-consuming and error prone. The definition and automatic generation of business events by Service Broker can make an enterprise business event-aware. This can be done by identifying key business events based on process flows, identifying the source of each event, creating event specifications and queue architecture, modifying source applications to "fire" business events, and developing application adapters to publish events on a message bus or a specified queue. Subscriber or consumer applications can then take the events from the bus or queue and perform their own processing such as updating a database, creating a file for a batch feed, or tracking the status of an order. When key business events are available, applications can readily use them rather than having to deduce them.

Figure 3:
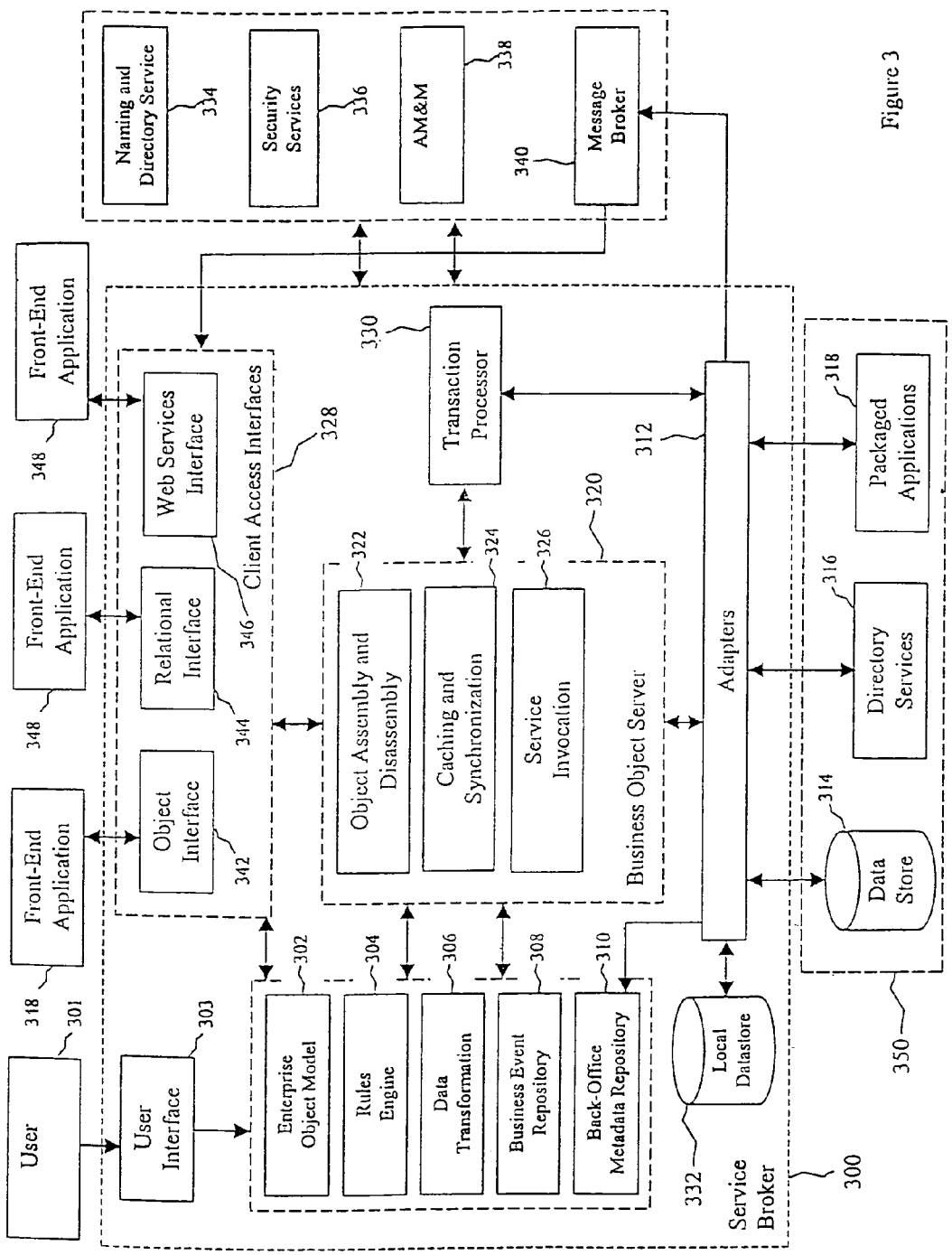
FIG. 3 is a block diagram depicting components in an embodiment of the Service Broker component of the Integration Infrastructure.

An embodiment of the Service Broker architecture is shown in FIG. 3. In this embodiment, Service Broker 300 consists of several related components including an Enterprise Object Model 302, a rules engine 304, a business event repository 308, adapters 312, a back-office metadata repository 310, a business object server 320, client access interfaces 328, a transaction processor 330, and a local data store 332.

Service Broker 300 can use an Enterprise Object Model (EOM) 302 to define the major business entities in the operations domain. The EOM 302 is an object-oriented representation that unifies business information and business services. It has facilities for accessing and updating data in back-office databases, legacy systems, and packaged applications as well as for accessing services in any back-office system 350. The EOM 302 is not dependent on any particular back-office application 350; it models data services across all back-office applications 350. A user 301 can define the EOM 302 at development time through user interface 303 using standard object-oriented programming principles such as object and relationships, inheritance, uses, and containment. The EOM 302 can be defined through the use of a Unified Modeling Language (UML) graphical editor or through the import of models from external sources such as Rational Rose. A metadata repository can be present within the EOM 302 for browsing EOM data and services such as classes and relationships.

Data and services can be mapped between the EOM 302 and back-office data and functions. The mapping is specific to a particular EOM object and a particular back-office system 350. The metadata provided by a back-office adapter 312 is used to aid in the mapping. The mapping can be bi-directional. That is, when a read event occurs, mapping is done from the format of a back-office system 350 to an EOM object. When a create, update, or delete event occurs, mapping is done from an EOM object to the format of a back-office system 350. There is support for bi-directional object/relational mapping and for bi-directional object/object mapping. The mappings can be one-to-one, one-to-many, or many-to-many. The ability to add custom code for data transformation for complex mappings also exists. At the time of design and development, data maps can be created using a visual editor that maps from the EOM to/from the specific source or back-office format type(s). Data maps can be versioned and stored in the back-office metadata repository 310. At run time, the appropriate data map is invoked by the business object server 320. Source data is passed to the map function and data in the target format is returned.

Various types of rules can be defined and stored in a rules engine 304 within Service Broker 300. These can include validation and data integrity rules, data and service access rules, event notification rules, and caching rules. The rules can be defined using a graphical tool such as Rules Editor. Validation and integrity rules associate rules with EOM objects. These rules ensure that all back-office application rules are independent and are not duplicated. Data and service access rules associate EOM objects with target systems and data maps. These rules deal with location and information reliability. Location-based rules are concerned with the mapping of a business object, attribute, or method to the data or methods of a back-office system 350 as well as the mapping of a back-office system 350 to the appropriate transformer and adapter 312. Information reliability-based rules determine the most reliable source of data at a given time. Another factor relevant to data and service access rules is the determination of the source of data based on latency and performance requirements. For example, for transactions requiring a low response time, a replicated data store rather than a packaged application can be accessed. Event notification rules associate business events to the EOM 302. These rules deal with criteria for determining when to publish what information to Message Broker 340. For example, an event can be considered to occur upon the creation, reading, updating, or deleting of an object, upon the invocation of a particular method, upon the evaluation of an expression, or when similar activities occur. Rules regarding such functions can be associated with business objects in the EOM 302. Caching rules concern what EOM business objects to cache, how long they should be cached, when they should be refreshed, and similar issues.

Service Broker 300 can use a business event repository 308 to contain a definition of all enterprise-wide business events that are of interest to multiple parties. Business events can be generated by packaged applications, by a database system, or by Service Broker 300 itself. The business event repository 308 also identifies all publishers for a particular business event. Adapters 312 within Service Broker 300 can provide access to back-office systems 350 for retrieving data, updating data, and invoking services. Multiple types of adapters 312 can exist including adapters for communicating with databases 314 such as Oracle and Sybase; protocol-based adapters for LDAP and other directory services 316, XML, Tuxedo, MQSeries, and similar protocols; adapters that interface to packaged applications 318; object-based adapters for CORBA, Java RMI, COM, and similar communication standards; native language-based adapters for languages such as C, C++, and Java; and custom adapters. Database adapters can supply metadata regarding table definitions and stored procedures. Object adapters can supply metadata regarding interface repositories and type libraries. Protocol adapters can supply metadata regarding XML DTDs and Tuxedo contract repositories. Adapters 312 are technology-specific rather than system-specific. For example, the same adapter would be used for accessing two different systems if both systems use CORBA. At the design and development stage, adapters 312 supply a data transformation engine 306 with metadata related to an external system to support mapping development and method invocation. At run time, adapters 312 are used by the business object server 320 to interact with back-office systems 350.

A back-office metadata repository 310 within Service Broker 300 can hold the metadata supplied by the adapters 312. For example, the table definitions and stored procedures supplied by a database adapter, the interfaces supplied by an object adapter, and the XML DTDs and Tuxedo contracts supplied by a protocol adapter can all be held by the back-office metadata repository 310. Several different types of relational data store 314, such as new data stores, existing data stores, and replicated data stores, may supply data to the back-office metadata repository 310. It is typically not feasible to directly access the data stores of commercial, off-the-shelf systems; the API provided by the vendor generally must be used. EOM objects in the repository 310 such as data and methods can be viewed. Back-office system classes, interfaces, tables, stored procedures, and transactions can also be viewed.

The business object server 320 component of Service Broker 300 manages the exchange of information between the Service Broker business objects and back-office applications 350. Multiple classes of the business object server 320 can exist such as account, customer, and product. Each business object server 320 implements data creation, reading, updating, and deletion functions and service methods associated with a particular business object. Each implementation fetches data from a back-office system 350, stores data in an appropriate back-office system 350, and invokes the appropriate services in a back-office system 350. The business object server 320 uses the rules engine 304, the transaction processor 330, and data transformation 306 to interact with back-office applications 350 using the appropriate adapter 312.

Among the functions performed by the business object server 320 are object assembly and disassembly 322, caching and synchronization 324, and service invocation 326. Object assembly deals with the creation, upon a client request, of a composite object or objects through the aggregation of data attributes from multiple back-office systems 350. For example, if a client queries to retrieve all subscribers tied to an account, the business object server 320 will instantiate multiple instances of a subscriber object based on data from a back-office system 350 and will populate each instance with appropriate data from one or more back-office systems 350. Object disassembly is the breaking of a composite object into multiple objects for storage in a back-office system 350. Caching is the loading of an instance of an object into memory for high-performance access. The business object server 320 manages the creation, refreshing, flushing, and other functions related to a cache based on pre-defined caching rules. The business object server 320 also keeps multiple copies of data in multiple back-office systems 350 synchronized when creation, updating, and deletion functions are performed. Synchronization is done based on rules defined in the rules engine 304. The business object server 320 uses the transaction processor 330 in its synchronization steps when an operation requires transactional integrity.

Based on a set of pre-defined rules, the service invocation functions 326 of the business object server 320 determine the back-office systems 350 required to support desired data or service operations, identify the transformations to be applied, identify the functions to be invoked on a target system 350, and invoke the appropriate back-office functions via the target system adapter 312. The object methods supported by Service Broker 300 are typically composite business services and are independent of how they are implemented in a back-office system 350. A single method call defined in the EOM 302 can translate into multiple service invocations 326 in a back-office system 350. The business object server 320 maintains the state of the invocations 326 and handles exceptions. Code written for a service invocation 326 is typically not specific to a particular target system 350 but rather uses rules and metadata to execute the appropriate back-office functions.

The client access interfaces 328 within Service Broker 300 allow front-end applications 348 to have a standardized interface through which to access back-end systems 350. This reduces complexity, eliminates tight coupling, and decreases reliance on custom development. The client access interfaces 328 can include an object interface 342, a relational interface 344, and a web services interface 346. The object interface 342 allows Java programs 348 to access objects using RMI or EJB session beans and allows Java, C, and C++ programs 348 to access objects using a standard Object Request Broker. The relational interface 344 can use ODBC or JDBC to allow client applications 348 to access information with statements that allow the selection, insertion, updating, and deletion of data. The relational interface 344 also allows client applications 348 to access object methods by invoking stored procedures. The web services interface 346 uses communication protocols such as http and SOAP to allow client applications 348 to access objects using XML documents, or for example XQuery which may be an example of an XML form of SQL statement.

The client access interfaces 328 within Service Broker 300 can allow access to multiple quality of service capabilities for both transactional and non-transactional services. The client access interfaces 328 can be integrated with an enterprise-wide naming and directory service 334 for location transparency both to client applications 348 and within the Service Broker framework. An existing enterprise-wide security service 336 can be used for authorization. The interfaces 328 can also be integrated with an application management and monitoring system 338 to perform error reporting, root-cause analysis, and predictive modeling.

As business and product applications interact with Service Broker 300, distributed transaction processing may become necessary. Service Broker 300 can provide transactional quality of service through the use of a transaction processor 330. Transaction processing may not be possible for data services such as transactions involving access to packaged applications using Application Programming Interfaces.

A local data store 332 can be used for data that may need to be made persistent within Service Broker 300 such as transient data and cross-reference data. The local data store 332 would typically not be used for System of Record data. The local data store 332 would not be available for use by other enterprise applications directly but could be accessed via the Service Broker client interfaces 328.

The components of Service Broker 300 can use previously existing infrastructure services. A naming and directory service 334 can be used by Service Broker client applications 348 and intra-Service Broker components such as the business object server 320 and the adapters 312 to locate target components and services. A security service 336 can be used to determine data access authorization credentials. The logging framework of an application management and monitoring system 338 can be used for error logging, monitoring, and reporting. Message Broker 340 can be used for exchanging messages with other systems using the publish/subscribe paradigm. More specifically, Service Broker 300 has the capability to generate business events and publish them to Message Broker 340. Message Broker 340 can then make the entire enterprise aware of the business events.

Figure 4:
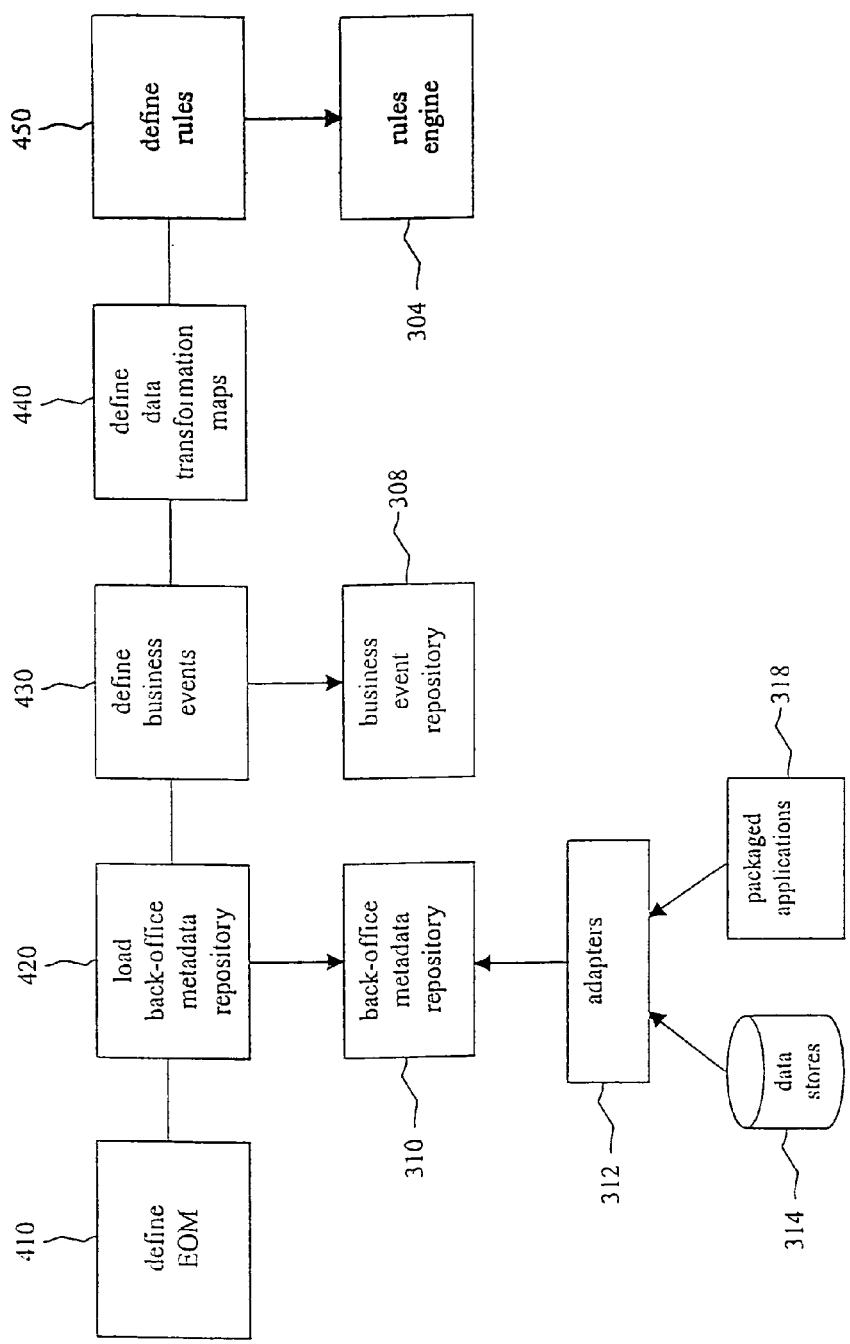
FIG. 4 is a block diagram depicting a sequence of events in the configuration of an embodiment of the Integration Infrastructure.

An embodiment of the process of configuring Service Broker is shown in FIG. 4. In box 410, the Enterprise Object Model is defined. Next, in box 420, the back-office metadata repository 310 is loaded via the adapters 312 that convert the data in data stores 314 and packaged applications 318. Business events are then defined in box 430 and placed in the business event repository 308. Data transformation maps are defined in box 440. Rules are defined in box 450 and placed in the rules engine 304.

Figure 5:
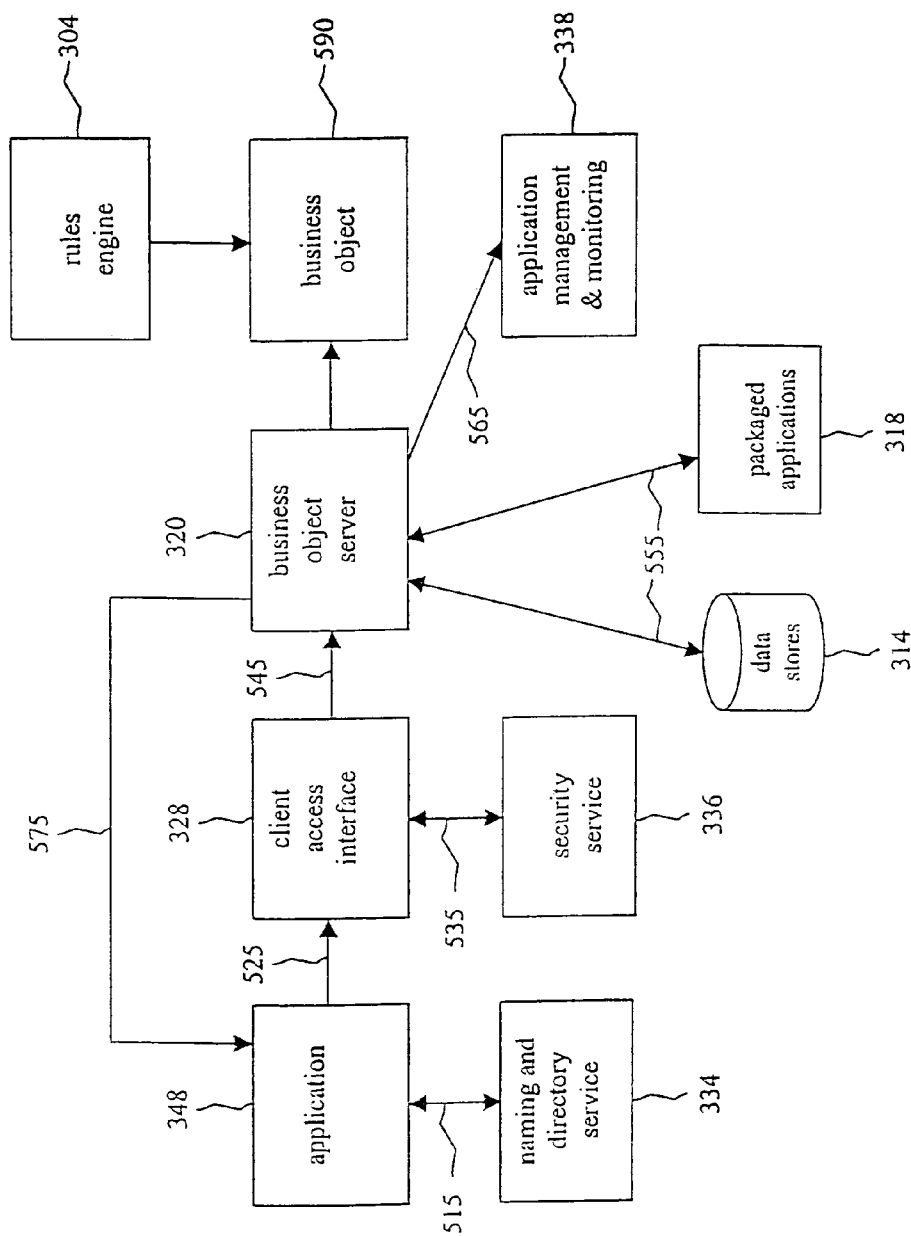
FIG. 5 is a block diagram depicting the retrieval of data in an embodiment of the Integration Infrastructure.

An embodiment of the process of a front-end application retrieving data from a back-end system is illustrated in FIG. 5. The application 348 first obtains a reference for a business service from a naming and directory service 334, via path 515. The application 348, via path 525, then requests access to the data from an appropriate client access interface 328. The client access interface 328, via path 535, calls a security service 336 to check the authorization of the front-end user. Upon the user being authorized, the client access interface 328, via path 545, invokes the business service on a business object server 320. Using location and mapping rules from a rules engine 304, the business object server 320 maps data from the EOM data format to the format of the target back-office system. The business object server 320, via a path 555, then retrieves the requested data from the target back-office system such as a data store 314 or a packaged application 318. The business object server 320 maps the retrieved data from the native format of the back-office system into the EOM data format and assembles a business object 590. The business object server 320, via path 565, logs the event in an application management and monitoring system 338 and then, via path 575, returns the result to the front-end application 348.

Figure 6:
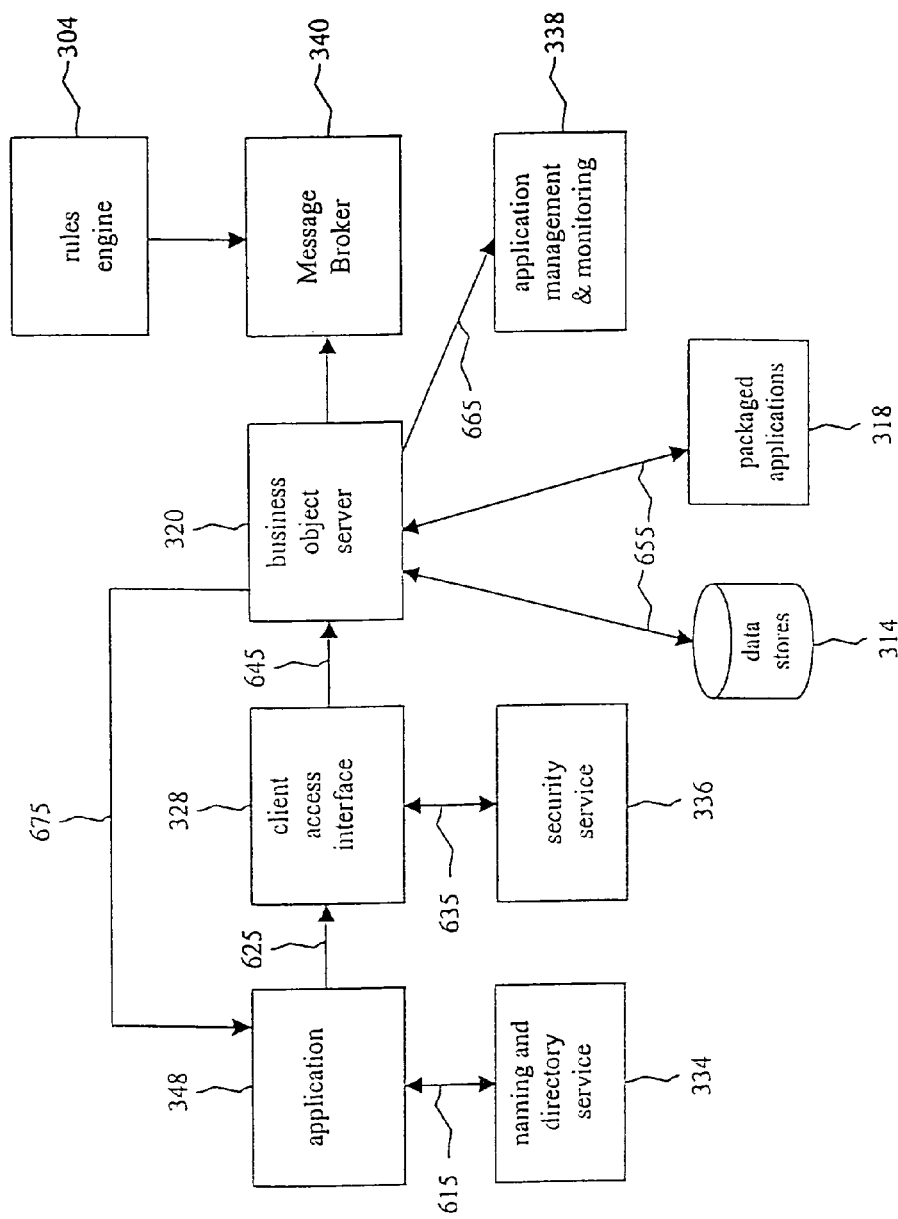
FIG. 6 is a block diagram depicting the invocation of a service in an embodiment of the Integration Infrastructure.

An embodiment of the process of a front-end application invoking a service in a back-end system is shown in FIG. 6. The application 348 first obtains a reference for the service from a naming and directory service 334, via path 615. The application 348, via path 625, then requests the service from an appropriate client access interface 328. The client access interface 328, via path 635, calls a security service 336 to check the authorization of the front-end user. Upon the user being authorized, the client access interface 328, via path 645, invokes the business service on a business object server 320. Using location and mapping rules from a rules engine 304, the business object server 320 maps the service request from the EOM data format to the format of the target back-office system. The business object server 320, via a path 655, then invokes the service in the target back-office system such as a data store 314 or a packaged application 318. The business object server 320, via path 665, logs the event in an application management and monitoring system 338 and then, via path 675, returns the result to the front-end application 348. If the event generation rules in the rules engine 304 indicate that components elsewhere in the enterprise need to be aware of the event, then the event is published to Message Broker 340.

In an embodiment, two options exist for the initial phase of the migration from an EI-based architecture such as that shown in FIG. 1 to the more modular Service Broker. In the first option, Service Broker would be implemented for a new data domain or subject area (such as a product/offer catalog) that would co-exist with the EI infrastructure. An application would retrieve previously existing data from the EI infrastructure but would use Service Broker for data related to the new subject area. In subsequent phases of this option, Service Broker could be built out for additional new data domains. If changes were needed in EI-based business transactions, additional Service Broker components could be developed and outdated business transactions could be retired. The phased implementation of Service Broker would be based on new project requirements for new data domains and the need for changes to existing component programs within the EI infrastructure. Over the phases, client applications would use Service Broker for accessing more and more data domains and message-based access would slowly be phased out.

In the second option, Service Broker would be layered on top of the existing EI infrastructure for a particular subject area such as account data. This EI wrapper would provide a synchronous access mechanism through which applications could retrieve data. An application could use this Service Broker interface and Service Broker would then call existing EI-based business transactions. In subsequent phases of this option, additional layers of Service Broker could be placed on the EI infrastructure for additional previously existing domains. New Service Broker capabilities could be built for new data domains. If changes were needed in EI-based business transactions, additional Service Broker components could be developed and outdated business transactions could be retired.

Service Broker can eliminate point-to-point interfaces between applications though one or both of two options. Under one option, point-to-point interfaces are migrated to the Service Broker architecture, thereby decoupling the source and target systems and providing enterprise-wide visibility to business events and transactions. Under the other option, business events and point-to-point interfaces to which the enterprise needs visibility are identified. These point-to-point interfaces are left intact but the target applications publish key business transaction events that occur over these interfaces so that visibility to the rest of the enterprise is provided. In either case, the development of new point-to-point interfaces is avoided.

Another element in the Integration Infrastructure framework is Message Broker. Message Broker is a middleware layer that can connect disparate applications and transport information in a consistent format between systems. It can be a component of an overall approach for integrating enterprise applications through event-based messaging. Message Broker can provide a foundation for business process automation by allowing integration of both data and business logic across applications. It can allow asynchronous communication and event-based integration through the use of communication queues or channels. The majority of communication is typically performed in a publish/subscribe manner but other communication paradigms, including request/response and point-to-point, can also be supported. Multiple consumers can easily subscribe to the same message. Message Broker can eliminate the need for tight integration between Application Programming Interfaces and hence provide a more flexible environment. A facility can be present to map simple or complex data structures from one data format to another. For example, non-XML data can be transformed into an XML format. A facility to connect to other native technologies such as CORBA, RDBMS, and J2EE can also be present. A filtering framework can allow applications to filter messages based on event type or message content. The capability can exist to provide enterprise level quality of service through guaranteed delivery, full transaction processing and recovery, and prioritization of messages on a channel or queue. Integration process automation can also be available through a facility to control and manage several sub-tasks tied to integrating systems via messaging. A capability to model and automate simple and complex business processes through workflow management can also be present. Service Broker can publish data to Message Broker based on the transactions it is brokering, such as data creation, updating, and deletion transactions, and can subscribe to information from Message Broker in order to perform operations such as updating a data store. IBM's MQSeries is an example of a system that supports message brokering.

Connectors and adapters can be present within Message Broker to act as single integration points for applications and the messaging environment. The adapters can comprise a message interface, a transformation module, and an application interface. The message interface publishes an event to or subscribes to an event from a message queue within the message infrastructure. The transformation layer then maps the data between the enterprise business representation and the application specific format. The application interface then uses an application-specific interface mechanism (such as CORBA, EJB, or RDBMS) to interface with an application.

An administrative console can be available within Message Broker that allows business process modeling to be performed. This user interface can allow business analysts to graphically model and automate cross-application business processes and related business rules. The administrative console can also provide real-time modeling and management of all components via event-based monitors, alarms, and alerts.

It can provide both local and remote administration from a single GUI available on any machine to any authorized user. It can also provide the ability to view the messages that are on the queues.

To minimize or eliminate data replication, desired business events can be made available in a standard format on a message bus via Message Broker. Applications can subscribe to these events and obtain desired data via the event or through the use of Service Broker. To migrate an event to Message Broker, key business events and the source system for each event are identified. A common format for each business event is then created. Source applications are then modified to "fire" these events; that is, source applications are given the ability to signal that a business event has occurred. A source application adapter publishes events on a message bus, a message queue, or via Message Broker. The source application adapter also performs a transformation of data related to the business event from the source data format to a standard data format. The source application adapter can publish the event and the data related to the event independently or it can combine the event and the data related to the event into a single data packet. A target application adapter subscribes to desired events and performs a transformation from the standard data format to the target data format. Implementation of the Message Broker infrastructure is typically tied to projects that identify which business events to publish and who the subscribers are. Existing replication and batch feed functionality can be replaced with a real-time Message Broker-driven approach for desired business events.

It is not necessary that all communication between all applications pass through Message Broker. For example, message brokering may not be necessary for the exchange of very specific information such as bill mediation data and voice mail provisioning data. Information such as this is more suitable for point-to-point communication since no enterprise-wide visibility is required; the information has only local significance between the two communicating applications. Other situations where message brokering may not be appropriate include cases where synchronous communication is desired, where data exchange is in the call path, or where a pre-built, vendor-provided interface already exists. In the latter case, lower costs and lower time to market can sometimes be achieved with the vendor interface.

In addition to Service Broker and Message Broker, Business Process Integration is another element in the Integration Infrastructure. Business Process Integration can be achieved with products such as Vitria's BusinessWare platform. Business Process Integration, which can also be referred to as Workflow or Business Process Management, can accelerate the delivery of new products and services and promote the rapid adaptation of business processes to constantly changing market conditions. Business Process Integration can improve efficiency and profitability by streamlining processes across systems and people, within an enterprise, and with partners. Business Process Integration can externalize and centralize business process coordination steps by separating business processing from functional processing. Business process logic can then be changed independently of functional applications. Business process changes can be implemented quickly using graphical modeling tools. Tracking, analysis, and reporting of process information and business metrics can be provided. A status and jeopardy management function can allow the tracking of task intervals and the generation of jeopardy notifications. A Business Process Integration engine can distribute work to target applications.

Business Process Integration can also support the logic for sequential, parallel, and conditional processing for automated tasks with customers and partners and manual tasks such as human processes and exception handling. It can also involve the execution of automated steps. Business processes can be nested or sub-processes can be chained together. Business Process Integration can use the Message Broker infrastructure to communicate with applications. When invoking a method to a target application, a process integrator can post a message destined for the target application. The process integrator can receive responses from applications by retrieving the messages that are sent to it. Users can acquire "manual" tasks from the work queues. It should be appreciated that the forgoing is exemplary and not all aspects are required, however specific enhancements which may each independently add value or be useful are described herein and below.

Figure 7:
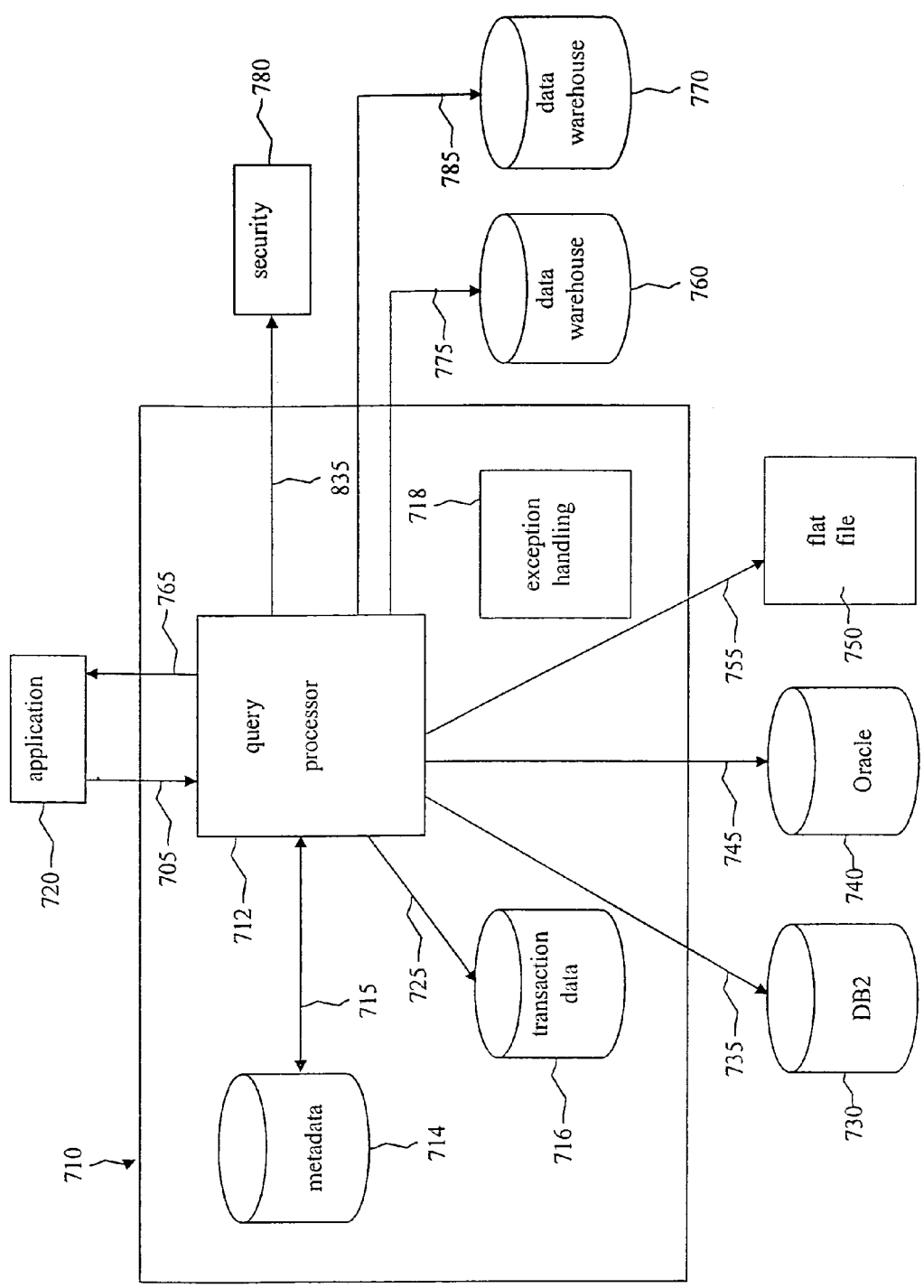
FIG. 7 is a block diagram of an embodiment of a data access layer.

FIG. 7 depicts an embodiment of a system through which transaction processing can be provided to data stores, such as those managed by service broker 300 as described above, and through which data warehouses can be kept up-to-date. A data access layer 710 handles data transfers among an external application 720, COTS data stores 730, 740, and 750, and data warehouses 760 and 770. The data stores shown in FIG. 7 are a DB2 database 730, an Oracle database 740, and a flat file 750 but other numbers and types of data stores could be present. Similarly, other numbers of data warehouses could be present.

The data access layer 710 comprises a query processor 712, a metadata database 714, a transaction database 716, and an exception handling module 718. The query processor 712 receives data requests from the application 720. A data request might be a query to retrieve data from a data store 730, 740, or 750, an update to the data in a data store 730, 740, or 750, or some other type of interaction with the data in a data store 730, 740, or 750.

The metadata database 714 informs the query processor 712 how to handle data requests. A logical data model in the metadata database 714 determines which data store 730, 740, or 750 a data request applies to, how the data should be updated, retrieved, aggregated, or otherwise manipulated and whether updated data should be sent to a data warehouse 760 or 770.

Data requests received by the query processor 712 are copied to the transaction database 716. If an error occurs at any point in the processing of a data request, the request can be retrieved from the transaction database 716 and used to return any data that was modified back to its previous state.

If the query processor 712 detects that an error has occurred in the processing of a data request, the query processor 712 informs the exception handling module 718. The exception handling module 718 retrieves the data request from the transaction database 716, determines from the data request the previous state of any data elements that were changed, and rolls the data elements back to their previous state.

FIG. 7 depicts a successful data request. In this embodiment, a data request is made sequentially to the DB2 database 730, the Oracle database 740, and the flat file 750. That is, the data request is first made to the DB2 database 730 and, if it is completed successfully, it is then made to the Oracle database 740. If the data request is completed successfully in the Oracle database 740, it is then made to the flat file 750.

An application 720 sends the data request to the query processor 712 via path 705. Query processor 712 consults the metadata database 714 via path 715 to determine how the data request should be handled. Query processor 712 also sends a copy of the data request to transaction database 716 via path 725. The logical data model in the metadata database 714 indicates to the query processor 712, via path 715, how to process the data request. The query processor 712 then attempts to perform the appropriate actions on the data stores 730, 740, and 750, via paths 735, 745, and 755, respectively.

In the embodiment of FIG. 1, the data request is completed successfully in all of the data stores 730, 740, and 750. Therefore, the copy of the data request in the transaction database 716 is no longer needed and is removed from the transaction database 716. The data request is then considered committed in the data stores 730, 740, and 750 and the query processor 712 sends a report of a successful data request to the application 720 via path 765. If the data request was a data update and if the logical data model in the metadata database 714 specifies that the updated data should be sent to the data warehouses 760 and 770, this is then done in a process described below.

The same data element can be maintained in more than one data store 730, 740, and/or 750 and might also be kept in one or more data warehouses 760 and/or 770. For example, a common data element such as a user name might need to exist in multiple locations. If a change is made to such a data element, the change would typically need to take place in all locations that contain the element. For example, the metadata database 714 might tell the query processor 712 that a data request needs to go to the data stores 730, 740, and 750 in that order. When the change is committed in the data stores 730, 740, and 750, the metadata database 714 might specify that the same change needs to occur in one or more data warehouses 760 and/or 770. While data requests to the data stores 730, 740, and 750 are done synchronously, updated data is sent to the data warehouses 760 and 770 in an asynchronous, publish/subscribe manner.

In publish/subscribe data transfer, a publishing application places a data message on one or more communication channels. The data message typically includes a header that describes the content of the message. Applications that have access to the communication channels can examine the header and determine if the message is relevant to them. If an application is interested in a message, it can accept, or subscribe to, the message. Publish/subscribe messaging is asynchronous in that a publishing application can publish a message at one time and a subscribing application can receive the message at later time.

In the embodiment of FIG. 7, the query processor 712, via paths 765 and 775, publishes any updates that were made to the data stores 730, 740, and/or 750. A data warehouse 760 or 770 can subscribe to the updates, via path 765 or 775, if it is interested. If a data warehouse 760 or 770 subscribes to the updates, the data in the data warehouse 760 or 770 will match the data in the data stores 730, 740, and 750.

In an embodiment, the original data request is not deleted from the transaction database 716 upon the successful updating of data stores 730, 740, and 750 but instead remains in the transaction database 716 until a data warehouse 760 or 770 responds that it has received the updated data. This allows the query processor 712 to retrieve a data request from the transaction database 716 and publish a data update again if an error occurs in the publish/subscribe process. Further, the process may notify an administrator of any error so that, when appropriate, additional action may be taken.

In this manner, the data warehouses 760 and 770 can replicate the data in the data stores 730, 740, and 750. After the data in the data stores 730, 740, and 750 has been copied to the data warehouses 760 and 770 one time in a batch process, the data warehouses 760 and 770 can stay up-to-date merely by keeping up with changes in the data stores 730, 740, and 750 as they occur. Updating a data warehouse 760 or 770 in this manner keeps the data warehouse 760 or 770 more current than copying data to the data warehouse 760 or 770 in a periodic batch process, as well as reducing the loads on the data stores 730, 740, and 750 that a batch process imposes.

Figure 8:
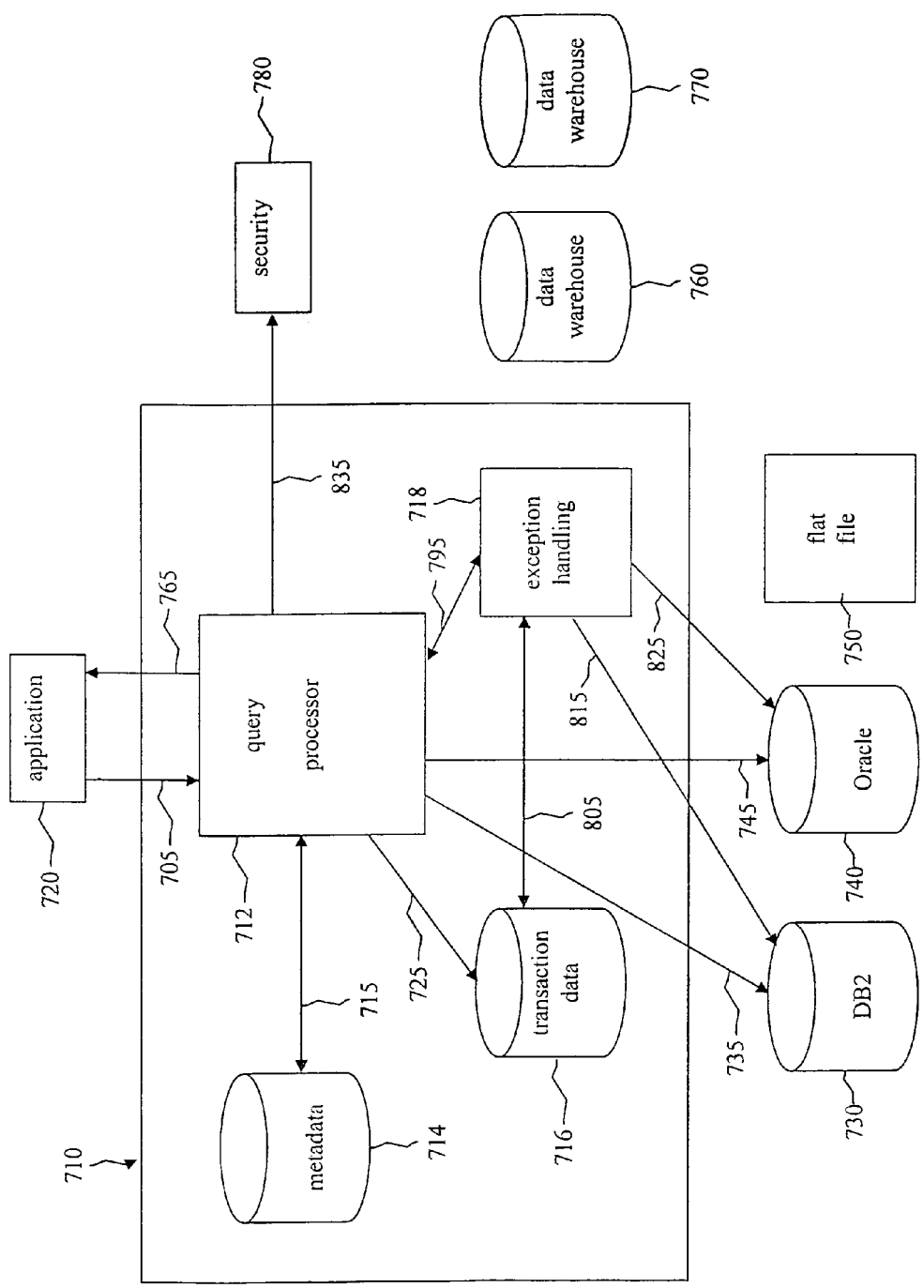
FIG. 8 is a block diagram of an alternative embodiment of a data access layer.

FIG. 8 depicts the processing of a data request in which an error occurs. When an error occurs, the data access layer 710 allows the data stores 730, 740, and 750 to be rolled back to their previous states. In the embodiment of FIG. 8, an application 720 makes a data request to data stores 730, 740, and 750 sequentially as described above. In this case, however, an error occurs in the processing of the request by the Oracle database 740 after the request is successfully completed in the DB2 database 730. Therefore, the DB2 database 730 and the Oracle database 740 need to be in the status they held prior to the data request.

For the Oracle database 740, the data request was never completed so the Oracle database 740 would remain in its previous state and no rollback of data would be needed. For the DB2 database 730, however, the data request was successfully completed and a rollback would be necessary. The rollback is managed by the exception handling module 718.

When an error occurs and the query processor 712 is unable to complete a data request, the query processor 712 informs the exception handling module 718 of the error via path 795 and specifies the data store 730, 740, or 750 in which the error occurred. The exception handling module 18 then retrieves the record of the data request from the transaction database 716 via path 805. In the embodiment of FIG. 8, the exception handling module 718 retrieves the record of the data request made to the DB2 database 730 and uses it to determine the prior state of the data in the DB2 database 730. Then, via path 815, the exception handling module 718 rolls the data in the DB2 database 730 back to its previous state.

The exception handling module 18 then informs the query processor 712, via path 795, of the actions it took in rolling back the data. The query processor 712 then sends an exception report to the requesting application 720 via path 765 and removes the copy of the data request from the transaction database 716 via path 725.

In addition to the above functions, the query processor 712 can also perform security functions by calling an external security service 780, via path 835, to determine if an application 720 is authorized to make a data request. The externalizing of security functions allows the use of a single sign-on for the data access layer 710 and for other applications in an enterprise.

The data access layer provides a form of transaction processing similar to a two-phase commit to commercial, off-the-shelf data stores that do not have that capability. Use of compensating transactions to achieve the two-phase commit capability is an example of an XA compliant transaction, or combinations of both XA compliant transactions and compensating transactions. Various combinations of these and other types of transactions may be employed and may be nested within one another, serially, or otherwise. One embodiment of the present disclosure employs a compensating transaction, which is similar to the two-phase commit, to accomplish a similar result. By using compensating transactions, the present embodiment provides transaction control capabilities to commercial-off-the-shelf (COTS) applications and their related data stores or databases that do not otherwise have this capability. Further, the present disclosure contemplates providing such transaction control to numerous COTS applications integrated within an enterprise, and also in combination with the existing enterprise data stores.

As an example of such transaction or transaction combination, when executing a compensating transaction to update several databases, if the transaction is successful then the non-compliant XA transaction may be executed. If the non-compliant XA transaction is successful, then the XA transaction may be committed and the application may be notified that the transaction was successful. If any of the transactions failed then the transaction may be compensated or rolled-back. In one embodiment, a compensating transaction may be described as the programming code or logic to restore, return, or back-out the recent change(s) or update(s) made to the data store or database. Other techniques and combinations of transactions will readily suggest themselves to one skilled in the art based on the present disclosure.

In some aspects, the data store or database may be operable to roll-back some or all the transaction(s) until the data store is instructed to commit the transaction. In other aspects, the roll-back may be handled by a program so that all or portions of the transaction record is maintained, including the previous state of the data, in order to be operable to restore the data in the event of a failure. The present disclosure, according to one embodiment, employs compensating transactions as a means of managing roll-backs of data for failed transactions in various environments, such as in environments where XA transactions are not supported.

Such transaction processing can be provided to multiple data stores that use disparate data storage protocols and formats. In addition, the data access layer keeps data warehouses more current than they are kept through traditional batch updates. The use of publish/subscribe messaging allows data warehouses to be updated whenever an update to an operational data store occurs.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A method for managing application data transactions comprising:
   receiving by a query processor a data request from an application to update at least one data element;
   storing a transaction record in a transaction data store based on the data request;
   determining, using a logical data model, one or more data stores and one or more data warehouses to update based on the one or more data stores and the one or more data warehouses maintaining the at least one data element of the data request, wherein the one or more data warehouses contain copies of data contained in the one or more data stores;
   responsive to receiving the data request, updating the at least one data element maintained by the one or more data stores based on the data request;
   determining whether the one or more data stores were successfully updated;
   where the one or more data stores were not successfully updated, returning data updated responsive to the data request in the one or more data stores to a prior data store state using a compensating transaction;
   responsive to receiving the data request, updating the at least one data element maintained by the one or more data warehouses based on the data request;
   determining whether the one or more data warehouses were successfully updated;
   where one or more of the one or more data warehouses were not successfully updated, returning data in the one or more data warehouses that has been updated responsive to the data request to a prior data warehouse state using a compensating transaction; and
   where one or more of the one or more data warehouses were not successfully updated, the at least one data element updated in the one or more data stores responsive to the data request remains updated.

2. The method of claim 1, further comprising requesting a security module to determine whether the data request by the application is authorized.

3. The method of claim 1, wherein the one or more data stores comprise a first data store and a second data store, and wherein updating the one or more data stores and determining the status of the updates further includes:
   changing data in the first data store, the first data store maintaining data in a first format; and
   failing to change data in the second data store, the second data store maintaining data in a second format,
   wherein determining whether the one or more data stores were successfully updated comprises:
      identifying that the change to the second data store failed, and
   wherein returning the data in the one or more data stores to a prior state using a compensating transaction comprises:
      restoring the data in the first data store to a prior state, the prior state defined as the data in the first data store prior to the change.

4. The method of claim 1, wherein updating the one or more data warehouses further includes:
   publishing the updates to the one or more data stores to a channel accessible by the one or more data warehouses;
   subscribing to the updates by the one or more data warehouses; and
   updating the transaction data store regarding the publication and subscription of the updates.

5. The method of claim 1, further comprising notify the application regarding whether the updates to the one or more data stores were successful.

6. The method of claim 1, further comprising:
   removing the transaction record from the transaction data store after the data is committed to the one or more data stores and the one or more data warehouses.

7. The method of claim 1, wherein the application is further defined as a commercial-off-the-shelf software application.

8. The method of claim 1, wherein the one or more data warehouses were not successfully updated, returning data in only the one or more data warehouses that has been updated based on the data request to a prior data warehouse state using a compensating transaction.

9. The method of claim 1, where the one or more data warehouses were not successfully updated, returning the data in all the data warehouses to a prior data warehouse state using the compensating transaction.

10. The method of claim 8, further comprising requesting a security module to determine whether the data request by the application is authorized.

11. The method of claim 8, wherein the one or more data stores comprise a first data store and a second data store, and wherein updating the one or more data stores and determining the status of the updates further includes:
   changing data in the first data store, the first data store maintaining data in a first format; and
   failing to change data in the second data store, the second data store maintaining data in a second format,
   wherein determining whether the one or more data stores were successfully updated comprises:

identifying that the change to the second data store failed, and wherein returning the data in the one or more data stores to a prior state using the compensating transaction comprises:

restoring the data in the first data store to a prior state, the prior state defined as the data in the first data store prior to the change.

12. The method of claim 8, wherein updating the one or more data warehouses further includes:

publishing the updates to the one or more data stores to a channel accessible by the one or more data warehouses;

subscribing to the updates by the one or more data warehouses; and updating the transaction data store regarding the publication and subscription of the updates.

13. The method of claim 8, further comprising notifying the application regarding whether the updates to the one or more data stores were successful.

14. The method of claim 8, further comprising:

removing the transaction record from the transaction data store after the data is committed to the one or more data stores and the one or more data warehouses.

15. The method of claim 8, wherein the application is further defined as a commercial-off-the-shelf software application.

* * * * *